United States Patent
Kobayashi et al.

(10) Patent No.: US 10,088,088 B2
(45) Date of Patent: Oct. 2, 2018

(54) CONNECTOR AND SOCKET

(71) Applicant: Surpass Industry Co., Ltd., Gyoda-shi, Saitama (JP)

(72) Inventors: Masamichi Kobayashi, Saitama (JP); Masahiro Hasunuma, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 15/630,451

(22) Filed: Jun. 22, 2017

(65) Prior Publication Data

US 2017/0370512 A1    Dec. 28, 2017

(30) Foreign Application Priority Data

Jun. 23, 2016 (JP) ................. 2016-124483

(51) Int. Cl.
| | |
|---|---|
| *F16L 37/38* | (2006.01) |
| *F16L 37/084* | (2006.01) |
| *F16L 37/23* | (2006.01) |
| *F16L 37/44* | (2006.01) |

(52) U.S. Cl.
CPC ............ *F16L 37/38* (2013.01); *F16L 37/084* (2013.01); *F16L 37/23* (2013.01); *F16L 37/44* (2013.01); *F17C 2205/037* (2013.01)

(58) Field of Classification Search
CPC . F16L 37/38; F16L 37/44; F16L 37/23; F16L 37/084; F17C 2205/037
See application file for complete search history.

(56) References Cited

U.S. PATENT DOCUMENTS

| | | | |
|---|---|---|---|
| 5,971,019 A | 10/1999 | Imai | |
| 2009/0188919 A1 | 7/2009 | Takanohashi | |
| 2011/0309114 A1 | 12/2011 | Chen | |
| 2012/0037625 A1* | 2/2012 | Hasunuma | ........... B67D 7/0294 220/200 |

(Continued)

FOREIGN PATENT DOCUMENTS

| | | |
|---|---|---|
| EP | 0927849 A2 | 7/1999 |
| JP | H11-193894 A | 7/1999 |

(Continued)

OTHER PUBLICATIONS

Extended European Search Report dated Nov. 6, 2017 in corresponding European Application No. 17176814.6, 8 pages.

*Primary Examiner* — Donnell Long
(74) *Attorney, Agent, or Firm* — MH2 Technology Law Group, LLP

(57) ABSTRACT

A connector including a plug and a socket. The socket includes: a socket body having an insertion hole formed therein; a columnar rotary valve inserted into the insertion hole; and a switching mechanism for switching an open state and a closed state. The rotary valve includes a pair of convex portions respectively in contact with both ends of the insertion hole to seal an outflow of a liquid; and a concave portion provided between the pair of convex portions and forming a cleaning space) in which a cleaning fluid is circulated between the concave portion and an inner peripheral surface of the insertion hole. The socket body includes a cleaning fluid inflow passage for guiding the cleaning fluid to the cleaning space and a cleaning fluid outflow passage through which the cleaning fluid flows out of the cleaning space.

4 Claims, 14 Drawing Sheets

(56) References Cited

U.S. PATENT DOCUMENTS

2014/0263419 A1* 9/2014 Mathison ................ B67D 7/80
                                                                    222/3
2015/0298960 A1   10/2015 Hennen

FOREIGN PATENT DOCUMENTS

| JP | 2009-173326 A | 8/2009 |
|---|---|---|
| WO | 03/045834 A1 | 6/2003 |
| WO | 2014/085701 A1 | 6/2014 |

* cited by examiner

US 10,088,088 B2

CONNECTOR AND SOCKET

CROSS-REFERENCE TO RELATED APPLICATIONS

This application is based on Japanese Patent Application No. 2016-124483, the contents of which are incorporated herein by reference in its entirety.

TECHNICAL FIELD

The present disclosure relates to a connector and a socket.

BACKGROUND ART

Heretofore, a plug and a socket which are attached to a liquid storing container for storing a drug solution or the like used for semiconductor production have been known (for example, see Japanese Unexamined Patent Application, Publication No. 2009-173326 (hereinafter referred to as "JP 2009-173326")).

In the plug and the socket disclosed in JP 2009-173326, the inside of a container is pressurized with a gas supplied from a gas supply pipe to the socket and a liquid contained in the container is guided to an external line via a siphon tube, the plug, and the socket.

SUMMARY

Technical Problem

However, the socket disclosed in JP 2009-173326 has a structure in which a liquid circulation state is switched by bringing a valve body provided on the socket and a valve seat provided on the plug into contact with each other, or separating the valve body and the valve seat from each other. The socket includes an urging mechanism which has a section where a passage sectional area is locally reduced and urges the valve body into a closed state. Accordingly, when the liquid is a slurry containing a polishing material or the like (a slurry in which solid particles are dispersed), the solid particles adhere to the section where the passage sectional area is locally reduced, which deteriorates the circulation of the liquid. Further, if the solid particles adhere to the urging mechanism of the valve body and are solidified, the valve body cannot be smoothly opened or closed.

Further, the socket disclosed in JP 2009-173326 does not include a mechanism for opening or closing a liquid return passage formed in the socket. Accordingly, when the socket is detached from the plug, the liquid remaining in the liquid return passage flows to the outside.

The present disclosure has been made in view of the above-mentioned circumstances, and an object of the present disclosure is to provide a connector and a socket which prevent a liquid from flowing to the outside when the connector and the socket are detached from a plug, while preventing the circulation of the liquid from deteriorating even when the liquid contained in a liquid storing container is a slurry containing solid particles.

Solution to Problem

To solve the above-mentioned problems, the present disclosure provides the following solutions.

A connector according to a first aspect of the present disclosure is a connector to be attached to an opening of a liquid storing container, the connector including: a plug to be attached to the opening; and a socket to be detachably attached to the plug. The plug includes a plug body in which a first liquid outflow passage through which a liquid contained in the liquid storing container is drawn out and a first liquid inflow passage for guiding the liquid flowing in from an outside of the liquid storing container into the liquid storing container are formed. The socket includes: a socket body in which a second liquid outflow passage through which the liquid is drawn out from the first liquid outflow passage flows to the outside and a second liquid inflow passage for guiding the liquid flowing in from the outside of the liquid storing container into the second liquid inflow passage are formed, the socket body being provided with a cylindrical insertion hole penetrating through each of the second liquid outflow passage and the second liquid inflow passage; a columnar rotary valve including an outflow through-hole formed at a position where the second liquid outflow passage is disposed and an inflow through-hole formed at a position where the second liquid inflow passage is disposed, the rotary valve being inserted into the insertion hole; and a switching mechanism that causes the rotary valve to be rotated and switches an open state and a closed state, the open state being a state in which the outflow through-hole and the second liquid outflow passage communicate with each other and the inflow through-hole and the second liquid inflow passage communicate with each other, the closed state being a state in which the outflow through-hole and the second liquid outflow passage do not communicate with each other and the inflow through-hole and the second liquid inflow passage do not communicate with each other. The rotary valve includes: a pair of convex portions respectively in contact with both ends of the insertion hole to seal an outflow of the liquid; and a concave portion provided between the pair of convex portions, a cleaning space in which a cleaning fluid is circulated being formed between the concave portion and an inner peripheral surface of the insertion hole. The socket body includes: a cleaning fluid inflow passage for guiding the cleaning fluid to the cleaning space; and a cleaning fluid outflow passage through which the cleaning fluid flows out of the cleaning space.

In the connector according to the first aspect of the present disclosure, for example, the liquid is sucked by an external pump in a state where the socket is attached to the plug, thereby allowing the liquid drawn out of the first liquid outflow passage of the plug to flow to the outside via the second liquid outflow passage of the socket. Further, the liquid circulated by the external pump is guided into the liquid storing container from the first liquid inflow passage of the plug via the second liquid inflow passage of the socket. In this manner, the connector according to the first aspect of the present disclosure has a structure that allows the liquid contained in the liquid storing container to flow to the outside and allows the liquid which has flown to the outside and circulated to flow into the liquid storing container.

The structure in which the liquid circulation state is switched by bringing the valve body provided on the socket and the valve seat provided on the plug into contact with each other or separating the valve body and the valve seat from each other includes an urging mechanism which has a section where a passage sectional area is locally reduced and urges the valve body into the closed state. Accordingly, when the liquid is a slurry containing a polishing material or the like (a slurry in which solid particles are dispersed), the solid particles adhere to the section where the passage sectional area is locally reduced, which deteriorates the circulation of the liquid. Further, if the solid particles adhere to the urging mechanism of the valve body and are solidified, the valve body cannot be smoothly opened or closed.

On the other hand, in the connector according to the first aspect of the present disclosure, the rotary valve is switched to the open state or the closed state by the switching mechanism, thereby making it possible to switch the open state in which the liquid is circulated in the second liquid outflow passage and the second liquid inflow passage via the outflow through-hole and the inflow through-hole and the closed state in which the liquid is not circulated in the second liquid outflow passage and the second liquid inflow passage via the outflow through-hole and the inflow through-hole.

Therefore, it is possible to prevent such deficiencies that the solid particles are accumulated on the section where the passage sectional area is locally reduced, which deteriorates the circulation of the liquid, and the solid particles adhere to the urging mechanism of the valve body, which makes it difficult to smoothly open and close the valve.

Further, the rotary valve is switched to the closed state by the switching mechanism, thereby preventing the liquid remaining in the socket from flowing to the outside when the socket is detached from the plug.

Furthermore, in the connector according to the first aspect of the present disclosure, the cleaning space is formed between the concave portion, which is provided between the pair of convex portions of the rotary valve, and the insertion hole of the socket body. In the closed state, the cleaning fluid flowing into the cleaning space from the cleaning fluid inflow passage appropriately cleans the solid particles adhering to the outer peripheral surface of the rotary valve, and then flows out of the cleaning fluid outflow passage.

Thus, the connector according to the first aspect of the present disclosure can prevent a deficiency that the solid particles are accumulated on the outer peripheral surface of the rotary valve, which makes it difficult to smoothly open and close the rotary valve.

The connector according to the first aspect of the present disclosure may have a structure in which: the socket body includes: a pair of first passage members respectively disposed at both ends of the inflow through-hole in the open state; and a pair of second passage members respectively disposed at both ends of the outflow through-hole in the open state; the pair of first passage members comes into contact with peripheral portions at the both ends of the inflow through-hole in the open state to prevent the second liquid inflow passage and the cleaning space from communicating with each other; and the pair of second passage members comes into contact with peripheral portions at the both ends of the outflow through-hole in the open state to prevent the second liquid outflow passage and the cleaning space from communicating with each other.

This structure prevents the liquid circulated in the inflow through-hole and the liquid circulated in the outflow through-hole from being guided into the cleaning space in the open state of the rotary valve. Accordingly, even when the liquid is a slurry containing a polishing material or the like, such a deficiency that the liquid flows into the cleaning space and adheres thereto can be prevented.

The connector according to the first aspect of the present disclosure may have a structure in which: the socket body includes: a first socket body; a second socket body having the insertion hole formed therein; and a third socket body disposed in a state where the second socket body is sandwiched between the first socket body and the third socket body; and the first socket body, the second socket body, and the third socket body are detachably arranged by a fastening member.

This structure facilitates a replacement operation for replacing the second socket body or the rotary valve with a new one, and also facilitates a cleaning operation for cleaning the second socket body and the rotary valve.

A socket according to a second aspect of the present disclosure is a socket to be detachably attached to a plug to be attached to an opening of a liquid storing container, the plug including a plug body in which a first liquid outflow passage through which a liquid contained in the liquid storing container is drawn out and a first liquid inflow passage for guiding the liquid flowing in from an outside of the liquid storing container into the liquid storing container are formed, the socket including: a socket body in which a second liquid outflow passage through which the liquid is drawn out from the first liquid outflow passage flows to the outside and a second liquid inflow passage for guiding the liquid flowing in from the outside of the liquid storing container into the first liquid inflow passage are formed, the socket body being provided with a cylindrical insertion hole penetrating through each of the second liquid outflow passage and the second liquid inflow passage; a columnar rotary valve including an outflow through-hole formed at a position where the second liquid outflow passage is disposed and an inflow through-hole formed at a position where the second liquid inflow passage is disposed, the rotary valve being inserted into the insertion hole; and a switching mechanism that causes the rotary valve to be rotated and switches an open state and a closed state, the open state being a state in which the outflow through-hole and the second liquid outflow passage communicate with each other and the inflow through-hole and the second liquid inflow passage communicate with each other, the closed state being a state in which the outflow through-hole and the second liquid outflow passage do not communicate with each other and the inflow through-hole and the second liquid inflow passage do not communicate with each other. The rotary valve includes: a pair of convex portions respectively in contact with both ends of the insertion hole to seal an outflow of the liquid; and a concave portion provided between the pair of convex portions, a cleaning space in which a cleaning fluid is circulated being formed between the concave portion and an inner peripheral surface of the insertion hole. The socket body includes: a cleaning fluid inflow passage for guiding the cleaning fluid to the cleaning space; and a cleaning fluid outflow passage through which the cleaning fluid flows out of the cleaning space.

In the socket according to the second aspect of the present disclosure, the cleaning space is formed between the concave portion, which is provided between the pair of convex portions of the rotary valve, and the insertion hole of the socket body, like in the connector described above. The cleaning fluid flowing into the cleaning space from the cleaning fluid inflow passage appropriately cleans the solid particles adhering to the outer peripheral surface of the rotary valve in the closed state, and then flows out of the cleaning fluid outflow passage.

Thus, the socket according to the second aspect of the present disclosure can prevent a deficiency that the solid particles are accumulated on the outer peripheral surface of the rotary valve, which makes it difficult to smoothly open or close the rotary valve.

Advantageous Effects

According to the present disclosure, it is possible to prevent a liquid from flowing to the outside when a connector and a socket are detached from a plug, while preventing the circulation of the liquid from deteriorating even when the liquid contained in a liquid storing container is a slurry containing solid particles. It is also possible to prevent a deficiency that the solid particles are accumulated on the outer peripheral surface of the rotary valve, which makes it difficult to smoothly open or close the rotary valve.

DESCRIPTION OF EMBODIMENTS

A liquid supply system according to an embodiment of the present disclosure will be described below with reference to the drawings.

Figure 1:
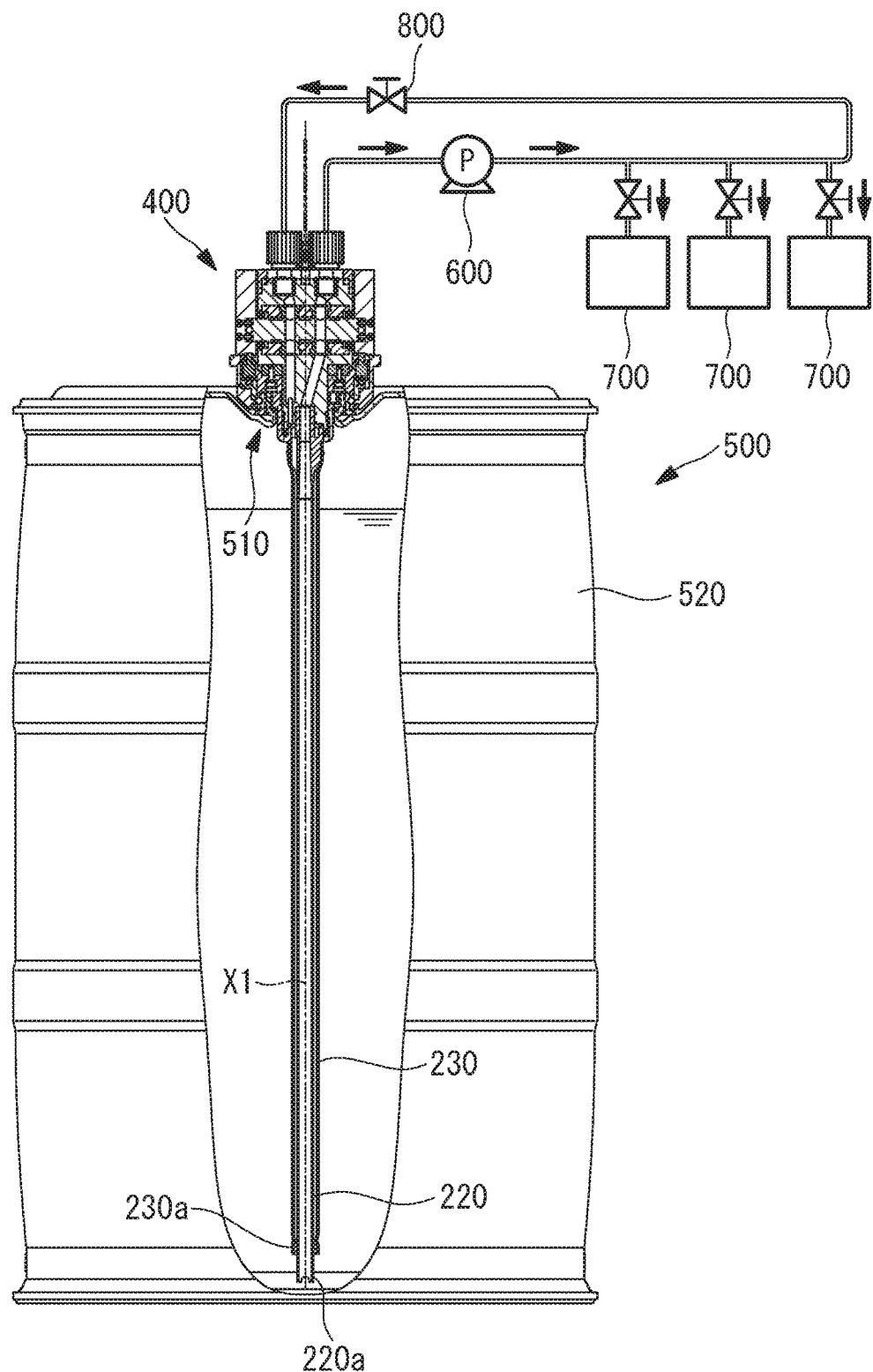
FIG. 1 is a block diagram showing a liquid supply system according to an embodiment of the present disclosure.

A liquid supply system according to this embodiment shown in FIG. 1 is a system in which a liquid contained in a liquid storing container 500 is sucked by a pump 600 and is supplied to a plurality of supply destination devices 700.

The amount of supply of the liquid to each supply destination device 700 is adjusted by a flow rate regulating valve provided on the supply destination device 700. The remaining liquid that is sucked by the pump 600 and is not supplied to each supply destination device 700 is returned to the liquid storing container 500 again via a circulating amount regulating valve 800.

In this manner, the liquid supply system according to this embodiment has a structure in which part of the liquid drawn out from the liquid storing container 500 is supplied to each supply destination device 700 and the remaining liquid is returned to each liquid storing container 500 again for circulation. This structure is intended to prevent solid particles from settling at the bottom of the liquid storing container 500, because the liquid contained in the liquid storing container 500 is a slurry in which solid particles are dispersed, and it is intended to prevent solid particles from settling at the bottom of the liquid storing container.

Note that the flow rate of the liquid to be circulated by the liquid supply system is adjusted by the aperture of the circulating amount regulating valve 800.

The slurry used as the liquid in this embodiment is, for example, a liquid containing a silica-based or seria-based polishing agent used for chemical mechanical polishing which is a wafer polishing method to be employed during semiconductor production.

As shown in FIG. 1, the liquid storing container 500 included in the liquid supply system according to this embodiment includes a container body 520 which contains a liquid, and an opening 510 which is provided in an upper surface (top board) of the container body 520 and is formed into a cylindrical shape about an axial line X1 (first axial line).

As shown in FIG. 1, the liquid supply system according to this embodiment includes a connector 400 to be attached to the opening 510 of the liquid storing container 500. The connector 400 is a device including a liquid outflow passage for causing the liquid contained in the liquid storing container 500 to be drawn out and fed to the pump 600; a liquid inflow passage for causing the liquid passing through the circulating amount regulating valve 800 to be returned to the liquid storing container 500; and a gas passage for introducing an outside air corresponding to the decreased amount of liquid from the liquid storing container 500. According to the connector 400 of this embodiment, outflow of the liquid, inflow of the liquid, and replacement of the outside air corresponding to the decreased amount of liquid can be achieved by one device attached to the opening 510 disposed at one section.

The connector 400 according to this embodiment will be described below with reference to the drawings.

Figure 2:
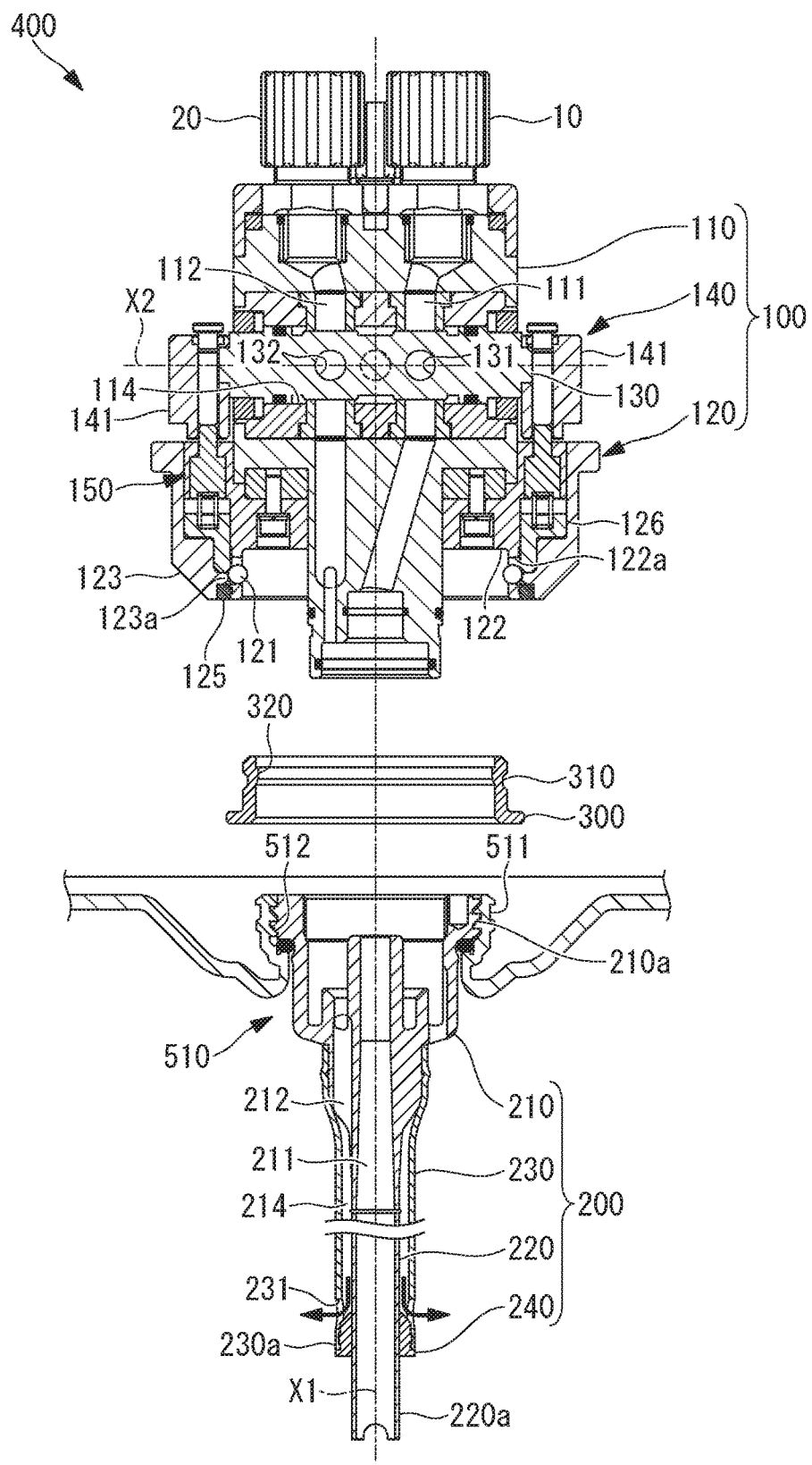
FIG. 2 is a partial longitudinal sectional view of a connector in a state where a socket is spaced apart from a plug and a key ring is spaced apart from an opening as viewed from the front side.
Figure 3:
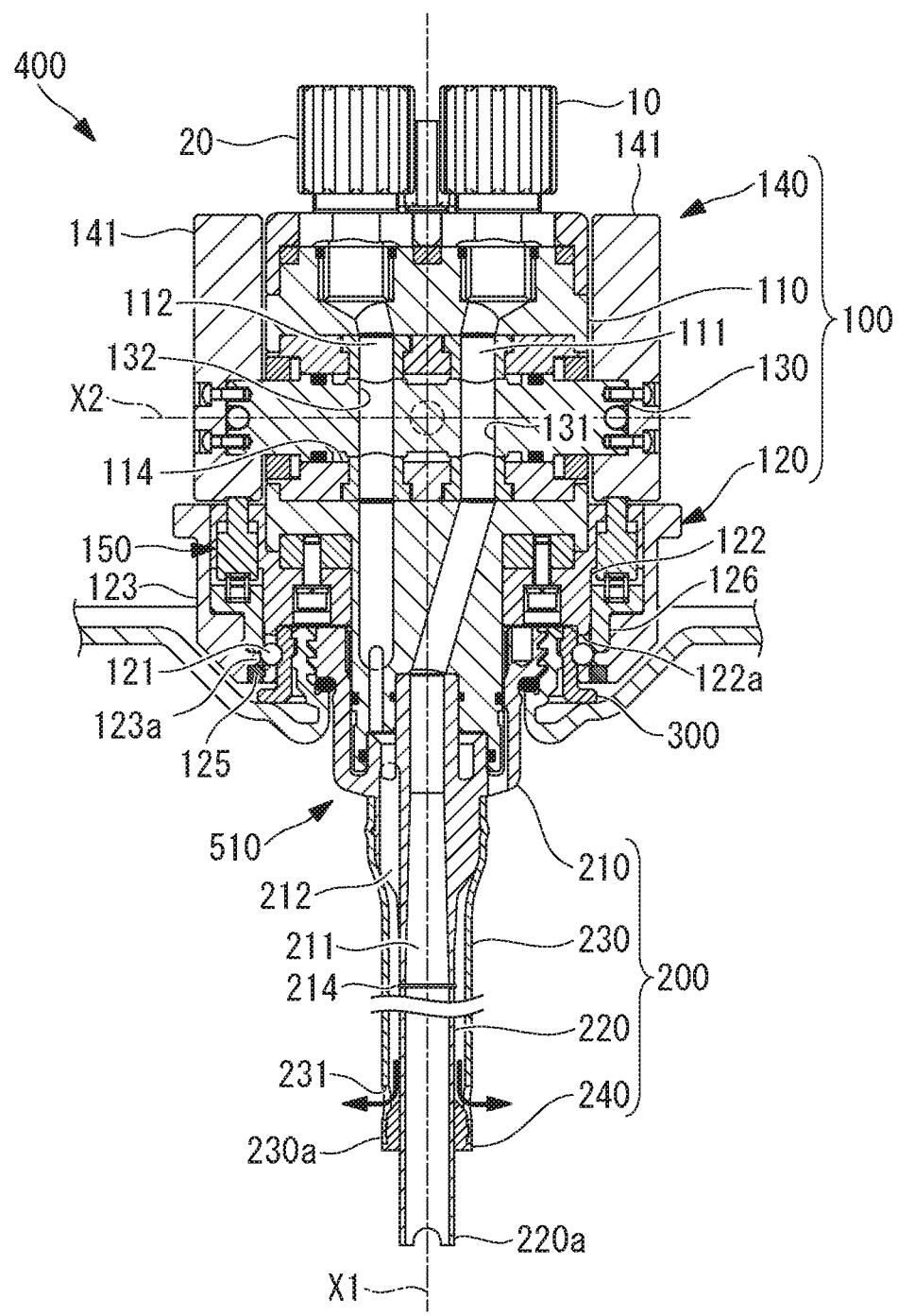
FIG. 3 is a partial longitudinal sectional view of the connector in a state where the socket is attached to the plug and the key ring is attached to the opening as viewed from the front side.

As shown in FIGS. 2 and 3, the connector 400 according to this embodiment includes a plug 200 to be fixed to a female screw 512 which is formed at the inner peripheral surface of the opening 510 formed in the upper surface of the liquid storing container 500; a key ring (opening) 300 to be attached to the outer peripheral surface of the opening 510; and a socket 100 to be detachably attached to the plug 200.

FIG. 2 is a longitudinal sectional view of the connector 400 in a state where the socket 100 is spaced apart from the plug 200 and the key ring 300 is spaced apart from the opening 510. FIG. 3 shows a state where the socket 100 is attached to the plug 200 and the key ring 300 is attached to the opening 510.

As shown in FIG. 2, the key ring 300 is a member which is made of a resin material and formed into a cylindrical shape extending along the axial line X1. The key ring 300 is a member including an endless engagement groove 310 which extends about the axial line X1 and is formed at the outer peripheral surface, and an endless engagement projection 320 which extends about the axial line X1 and is formed at the outer peripheral surface. The inner diameter of the engagement projection 320 is smaller than the outer diameter of the opening 510 of the liquid storing container 500. The inner diameter of the engagement projection 320 substantially equal to the outer diameter of an engagement groove 511 which is formed in the opening 510.

The key ring 300, which is made of a resin material, is pressed against the opening 510 by a jig (not shown), thereby elastically deforming the key ring 300. As a result, the engagement projection 320 formed on the inner peripheral surface of the key ring 300 is engaged with the engagement groove 511 formed in the outer peripheral surface of the opening 510, thereby allowing the key ring 300 to be fixed to the opening 510.

Figure 4:
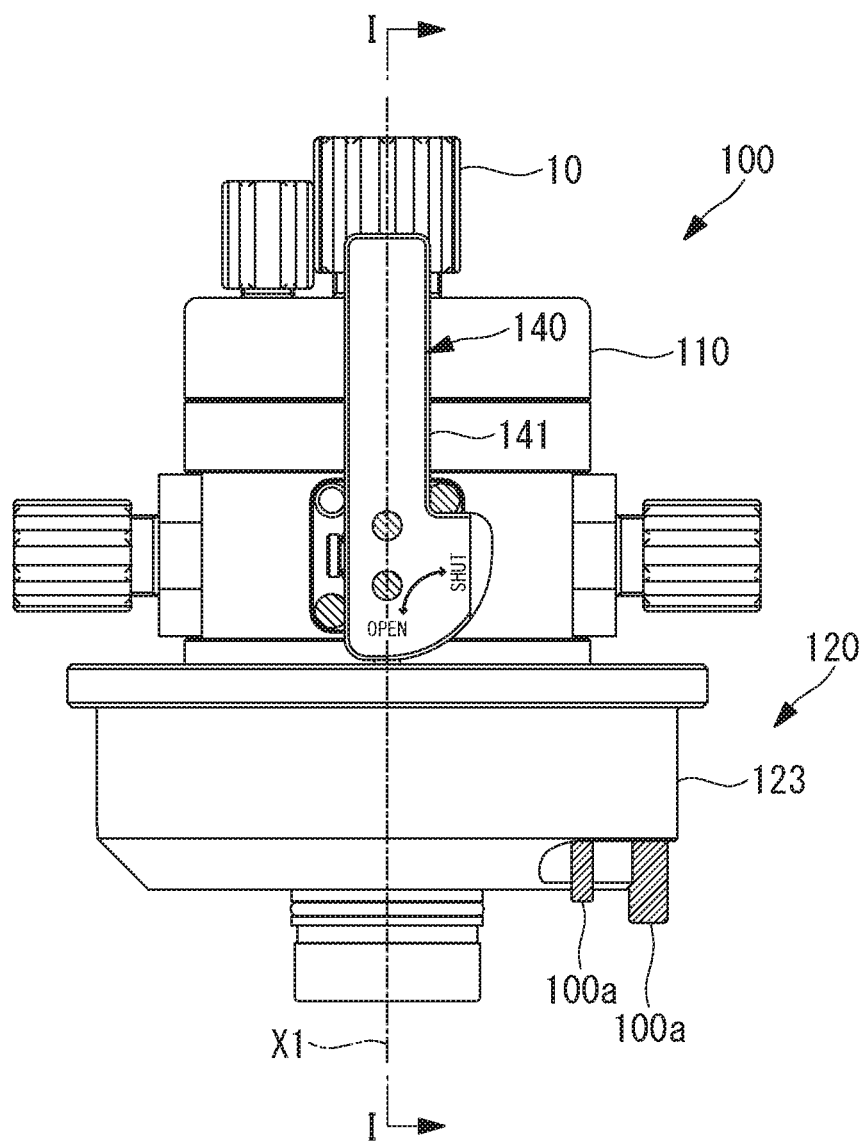
FIG. 4 is a left side view of a socket in an open state shown in FIG. 3.

The key ring 300 includes a plurality of key holes (not shown) in which a plurality of key rods 100a included in the socket shown in FIG. 4 are respectively accommodated. When the positions of the plurality of the key rods 100a included in the socket 100 do not match the positions of the key holes in which the key rods are respectively accommodated, the socket 100 cannot be fixed to the key ring 300. This makes it possible to prevent an improper connection in which the socket 100 is attached to the opening 510 of the liquid storing container 500 to which an improper key ring 300 is attached.

The plug 200 included in the connector 400 according to this embodiment will be described.

As shown in FIG. 2, the plug 200 includes a plug body 210; an inside pipe 220 which is attached to a lower position of the plug body 210 and is formed into a cylindrical shape about the axial line X1; an outside pipe 230 which is attached to the plug body 210 and has a cylindrical shape; and a sealing member 240 for sealing the space between the outside pipe 230 and the inside pipe 220.

Each member constituting the plug 200 is formed of a fluorine-contained resin material, such as PFA (tetrafluoroethylene-perfluoroalkyl vinyl ether copolymer), or a crystalline thermoplastic resin such as HDPE (high-density polyethylene).

The plug body 210 is a member which is formed into a substantially cylindrical shape about the axial line X1 and includes a male screw 210a that is formed at the outer peripheral surface of an upper end thereof. The male screw 210a of the plug body 210 is fastened to the female screw 512 formed at the inner peripheral surface of the opening 510, thereby allowing the plug body 210 to be fixed to the inner peripheral surface of the opening 510.

In the plug body 210, a first liquid outflow passage 211 and a first liquid inflow passage 212 are formed.

The first liquid outflow passage 211 is a passage for causing the liquid contained in the liquid storing container 500 to be drawn out and guided to an outflow port 10. The first liquid inflow passage 212 is a passage for guiding the liquid flowing in from the outside of the liquid storing container 500 via an inflow port 20 into the liquid storing container 500.

The inside pipe 220 is a member formed into a cylindrical shape along the axial line X1. As shown in FIG. 1, a lower end 220a of the inside pipe 220 is disposed near the bottom of the liquid storing container 500 in a state where the plug 200 is attached to the opening 510 of the liquid storing container 500.

The inside pipe 220 is attached to a lower end of the plug body 210 by thermal welding and guides the liquid contained in the liquid storing container 500 to the first liquid outflow passage 211 of the plug body 210.

The outside pipe 230 is a member formed into a cylindrical shape along the axial line X1. As shown in FIGS. 1 and 2, a lower end 230a of the outside pipe 230 is disposed at an upper position of the lower end 220a of the inside pipe 220 in a state where the plug 200 is attached to the opening 510 of the liquid storing container 500.

The outside pipe 230 is attached to the outer peripheral surface at a lower position of the plug body 210 by press fitting and is disposed outside of the inside pipe 220. Between the inner peripheral surface of the outside pipe 230 and the outer peripheral surface of the inside pipe 220, an annular passage 214 for guiding the liquid to be guided to the first liquid inflow passage 212 of the plug body 210 into the liquid storing container 500 is formed.

At the lower end 230a of the outside pipe 230, a plurality of outflow holes 231 through which the liquid is caused to flow out of the annular passage 214 into the liquid storing container 500 are formed at a plurality of sections (for example, four sections at an interval of 90°) about the axial line X1.

The sealing member 240 is a member for sealing the space between the inner peripheral surface of the lower end 230a of the outside pipe 230 and the outer peripheral surface of the inside pipe 220. The sealing member 240 prevents the liquid flowing in from the annular passage 214 from being directly guided to the bottom surface of the liquid storing container 500 along the axial line X1. Since the lower end of the annular passage 214 is sealed by the sealing member 240, the liquid which has reached the lower end of the annular passage 214 flows out into the liquid storing container 500 through the outflow holes 231 as indicated by arrows shown in FIG. 2.

The liquid falling from the upper position to the lower position along the annular passage 214 flows out horizontally (in a direction perpendicular to the axial line X1) from the plurality of outflow holes 231. Accordingly, the liquid flows out in a plurality of directions in which the plurality of outflow holes 231 are opened, so that the liquid in the vicinity of the bottom surface of the liquid storing container 500 flows favorably. Accordingly, when the liquid is a slurry containing a polishing agent or the like (a slurry in which solid particles are dispersed), the state in which the solid particles and the liquid are favorably mixed in the vicinity of the bottom surface of the liquid storing container 500 is maintained.

In the above description, the plurality of outflow holes 231 are formed at the lower end 230a of the outside pipe 230. Alternatively, a single outflow hole 231 may be formed at the lower end 230a of the outside pipe 230.

The socket 100 included in the connector 400 according to this embodiment will be described below.

As shown in FIG. 2, the socket 100 includes a socket body 110, a ball lock mechanism 120, which is attached to the socket body 110, a columnar rotary valve 130, which is inserted into a cylindrical insert hole 114 formed in the socket body 110, a switching mechanism 140 that rotates the rotary valve 130 about an axial line X2 (second axial line), and a regulating mechanism 150 that regulates switching from a closed state to an opened state by the switching mechanism 140.

As shown in FIG. 3, the socket 100 is fixed to the key ring 300, which is attached to the outer peripheral surface of the opening 510 of the liquid storing container 500, by the ball lock mechanism 120 in a state where a lower end of the socket body 110 is inserted into the plug body 210.

In the socket body 110, a second liquid outflow passage 111 and a second liquid inflow passage 112 are formed. The second liquid outflow passage 111 is a passage that causes the liquid to be drawn out from the first liquid outflow passage 211 via the discharge port 10 to flow to the outside. The second liquid inflow passage 112 is a passage that guides the liquid flowing in from the outside of the liquid storing container 500 via the inflow port 20 to the first liquid inflow passage 212.

The ball lock mechanism 120 is a mechanism that causes a plurality of lock balls 121 to be engaged with an engagement groove 310, which is formed along the circumferential direction about the axial line X1 of the key ring 300, and then fixes the plurality of lock balls 121 to the engagement groove 310. The state where the socket 100 and the plug 200 are coupled is maintained by fixing the socket body 110 to the key ring 300 by using the ball lock mechanism 120.

Figure 9:
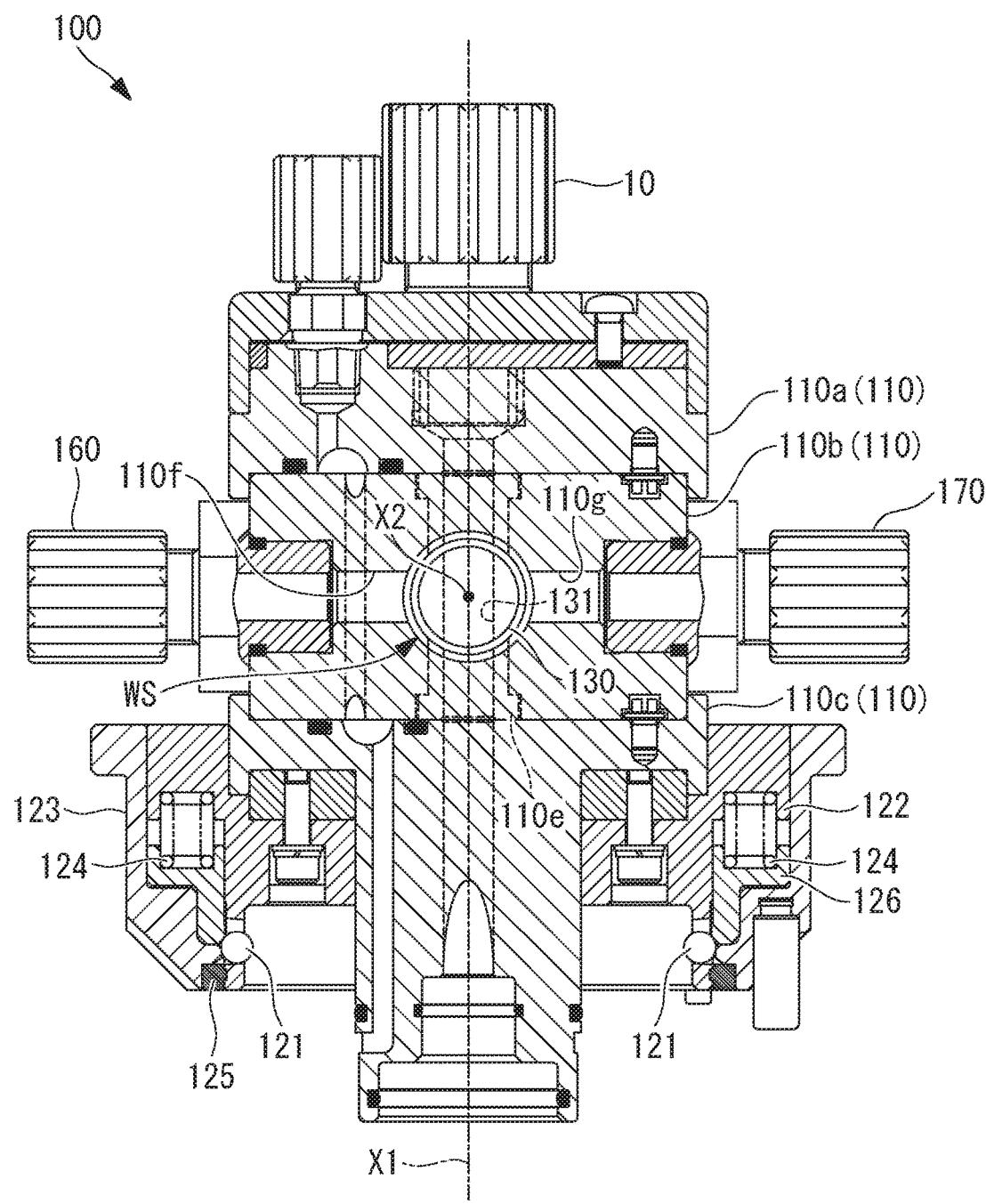
FIG. 9 is a partial sectional view taken along a line III-III of the socket shown in FIG. 6.

As shown in FIGS. 3 and 9, the ball lock mechanism 120 includes a plurality of lock balls 121, a socket member (first cylindrical member) 122, a sleeve (second cylindrical member) 123, a spring (urging force generation portion) 124, a stop ring 125, and a spring receiving member 126.

Figure 5:
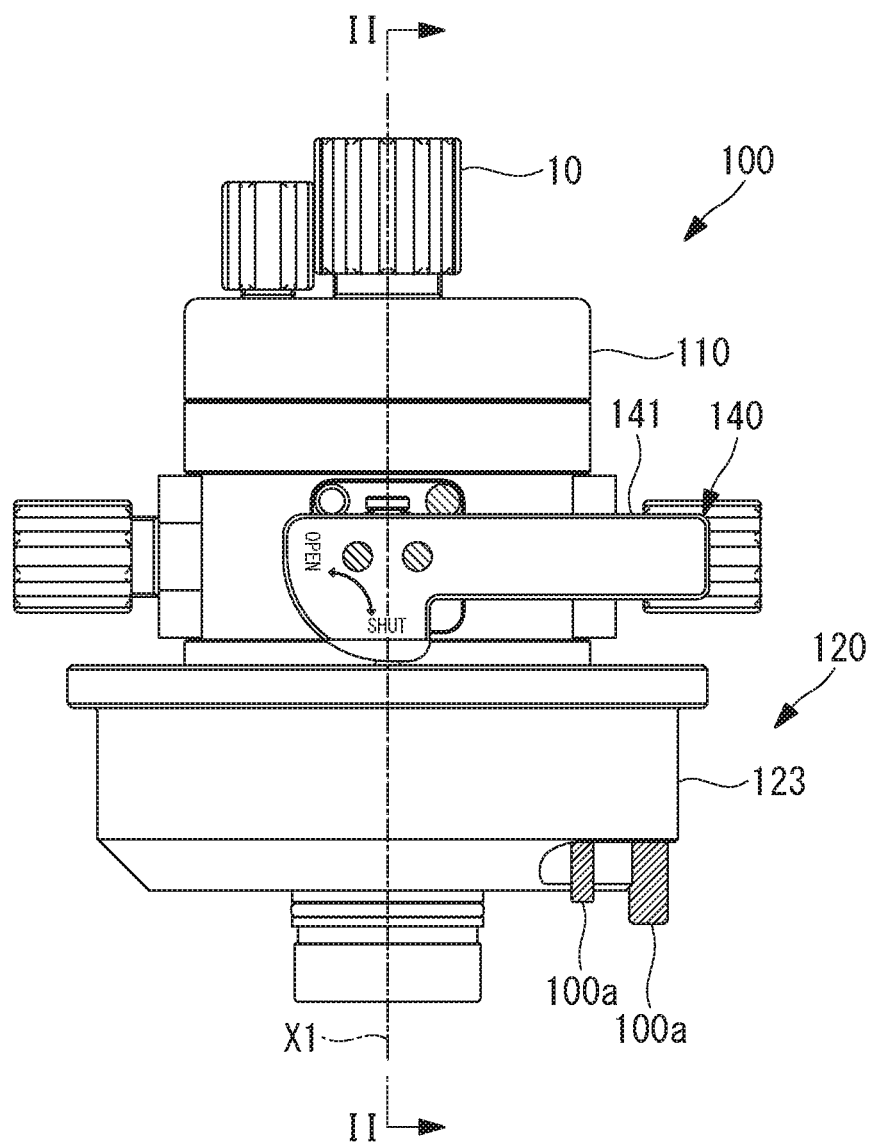
FIG. 5 is a left side view of the socket in a closed state.

The socket member 122 is a member including a plurality of opening holes 122a which are each formed into a cylindrical shape about the axial line X1 and have a diameter smaller than the outer diameter of spherical lock balls 121. As shown in FIG. 5, the lock balls 121 are respectively accommodated in the opening holes 122a of the socket member 122. The outer diameter of each of the lock balls 121 is larger than the diameter of each of the opening holes 122a, which prevents the lock balls 121 from being completely disengaged from the opening holes 122a into the inner peripheral side of the socket member 122.

Although FIGS. 3 and 9 illustrate only two lock balls 121, the ball lock mechanism 120 includes a plurality of lock balls 121 at regular intervals (for example, 12 lock balls at an interval of 30°) in the circumferential direction about the axial line X1. Similarly, the ball lock mechanism 120 includes a plurality of opening holes 122a at regular intervals (for example, 12 opening holes at an interval of 30°) in the circumferential direction about the axial line X1.

The sleeve 123 is a member that is formed into a cylindrical shape about the axial line X1 and is disposed at the outer peripheral side of the socket member 122. An upper end position of the sleeve 123 is regulated by the socket member 122 and the spring receiving member 126, and a lower end position of the sleeve 123 is regulated by an annular stop ring 125 which is attached to the outer peripheral surface at the lower end side of the socket member 122. The sleeve 123 is movable relatively to the socket member 122 between the upper end position and the lower end position along the axial line X1.

The sleeve 123 includes a regulating portion 123a that regulates the plurality of lock balls 121 respectively accommodated in the opening holes 122a to be in a state where the lock balls 121 are engaged with the engagement groove 310 of the key ring 300.

As shown in FIG. 9, the spring 124 is an elastic member having an upper end (one end) that is formed along the axial line X1 and regulated by the socket member 122, and having a lower end (the other end) that is formed along the axial line X1 and regulated by the sleeve 123 via the spring receiving member 126. The spring 124 generates an urging force by elastic deformation, and urges the sleeve 123 against the lower end position where the regulating portion 123a of the sleeve 123 is in contact with the lock balls 121. The springs 124 are arranged at a plurality of sections at regular intervals (for example, six sections at an interval of 60°) in the circumferential direction about the axial line X1. The springs 124 are arranged at a plurality of sections at regular intervals, thereby providing the sleeve 123 with a uniform urging force.

In this case, the spring receiving member 126 is a member that is formed with an annular shape about the axial line X1, and has opening holes for accommodating the springs 124 that are formed at a plurality of sections.

While the springs 124 are provided at the plurality of sections at regular intervals in the circumferential direction about the axial line X1 in this embodiment, a single spring having the same diameter as that of the spring receiving member 126 may be provided about the axial line X1.

As shown in FIGS. 2 and 3, the rotary valve 130 is a member formed into a columnar shape along the axial line X2 which is perpendicular to the axial line X1. The rotary valve 130 includes an outflow through-hole 131 which is formed at a position where the second liquid outflow passage 111 on the axial line X2 is disposed, and an inflow through-hole 132 which is formed at a position where the second liquid inflow passage 112 on the axial line X2 is disposed. The rotary valve 130 is inserted into the insert hole 114 such that the rotary valve 130 go through the second liquid outflow passage 111 and the second liquid inflow passage 112, wherein the insert hole 114 is formed in the socket body 110, so as to be rotatable about the axial line X2.

The switching mechanism 140 is a mechanism that is coupled to the rotary valve 130 and causes the rotary valve 130 to be rotated about the axial line X2, thereby switching the rotary valve 130 to one of an open state and a closed state.

As shown in FIG. 3, the open state of the rotary valve 130 is a state in which the outflow through-hole 131 formed in the rotary valve 130 communicates with the second liquid outflow passage 111 of the socket body 110 and the inflow through-hole 132 formed in the rotary valve 130 communicates with the second liquid inflow passage 112 of the socket body 110.

As shown in FIG. 2, the closed state of the rotary valve 130 is a state in which the outflow through-hole 131 formed in the rotary valve 130 does not communicate with the second liquid outflow passage 111 of the socket body 110 and the inflow through-hole 132 formed in the rotary valve 130 does not communicate with the second liquid inflow passage 112 of the socket body 110.

As shown in FIG. 3, in the open state, a first liquid outflow passage 211 and the second liquid outflow passage 111 communicate with each other and a first liquid inflow passage 212 and the second liquid inflow passage 112 communicate with each other.

In the closed state, the first liquid outflow passage 211 and the second liquid outflow passage 111 do not communicate with each other and the first liquid inflow passage 212 and the second liquid inflow passage 112 do not communicate with each other.

The switching mechanism 140 includes a pair of opening/closing arms (regulating member) 141 that are coupled to both ends of the rotary valve 130 and accept an opening/closing operation by an operator.

The operator causes the plug 200 to be fixed to the inner peripheral surface of the opening 510 to attach the socket 100 to the key ring 300, and then grips the opening/closing arms 141 to be rotated about the axial line X2. As a result, the rotary valve 130 is switched from the closed state shown in FIG. 2 to the open state shown in FIG. 3.

The rotary valve 130 having the closed state and the open state that are switched by the switching mechanism 140 and the socket body 110 into which the rotary valve 130 is inserted will now be described in detail with reference to the drawings.

FIG. 4 is a left side view of the socket 100 in the open state shown in FIG. 3. FIG. 5 is a left side view of the socket 100 in the closed state.

As shown in FIG. 4, in the socket 100 in which the rotary valve 130 is in the open state, the opening/closing arms 141 extend upward along the axial line X1. On the other hand, as shown in FIG. 5, in the socket 100 in which the rotary valve 130 is in the closed state, the opening/closing arms 141 extend in the horizontal direction perpendicular to the axial line X1.

The operator of the connector 400 grips the opening/closing arms 141 and rotates the opening/closing arms 141 about the axial line X2, thereby making it possible to switch the open state and the closed state of the rotary valve 130.

Figure 6:
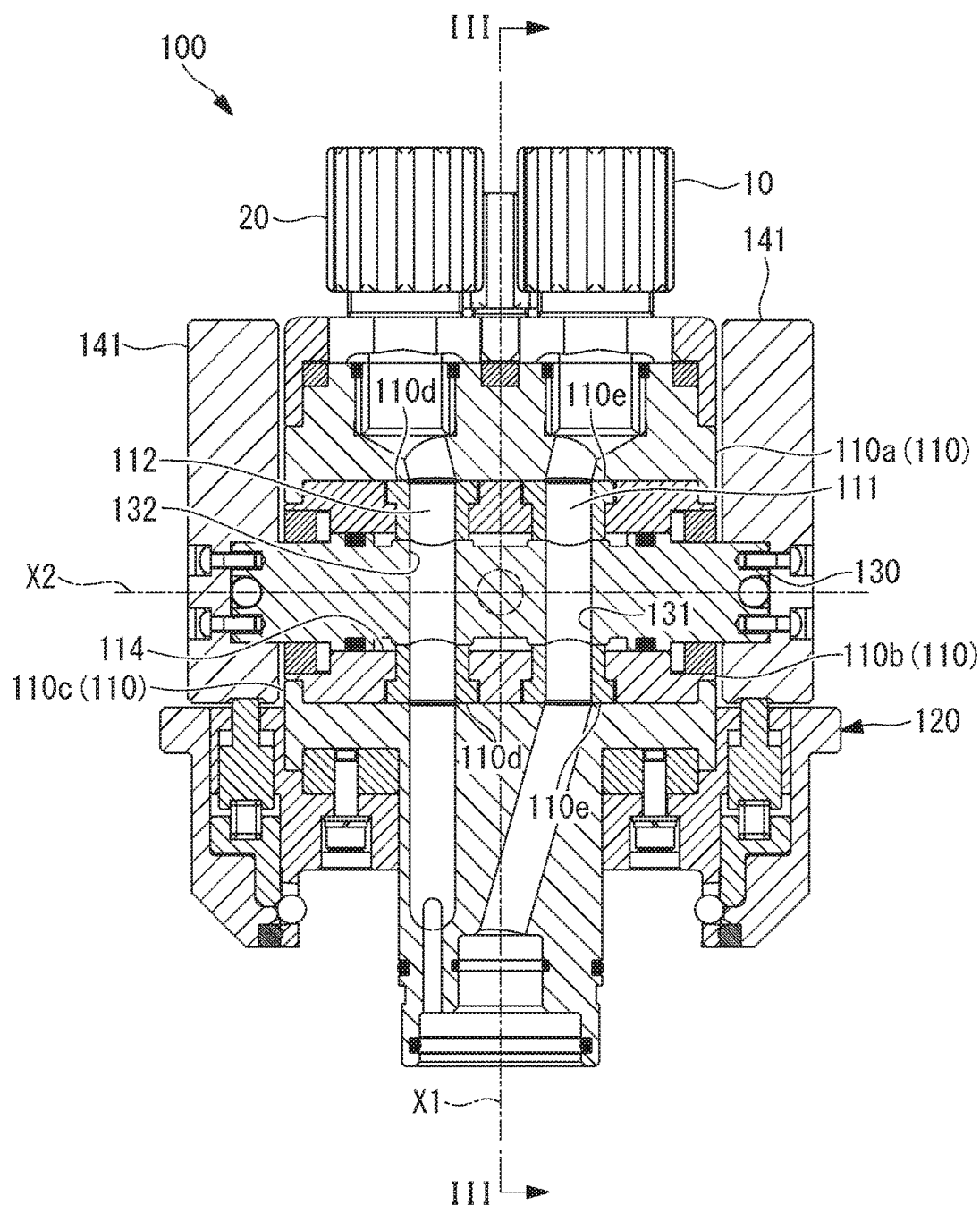
FIG. 6 is a partial sectional view taken along a line I-I of the socket shown in FIG. 4.
Figure 7:
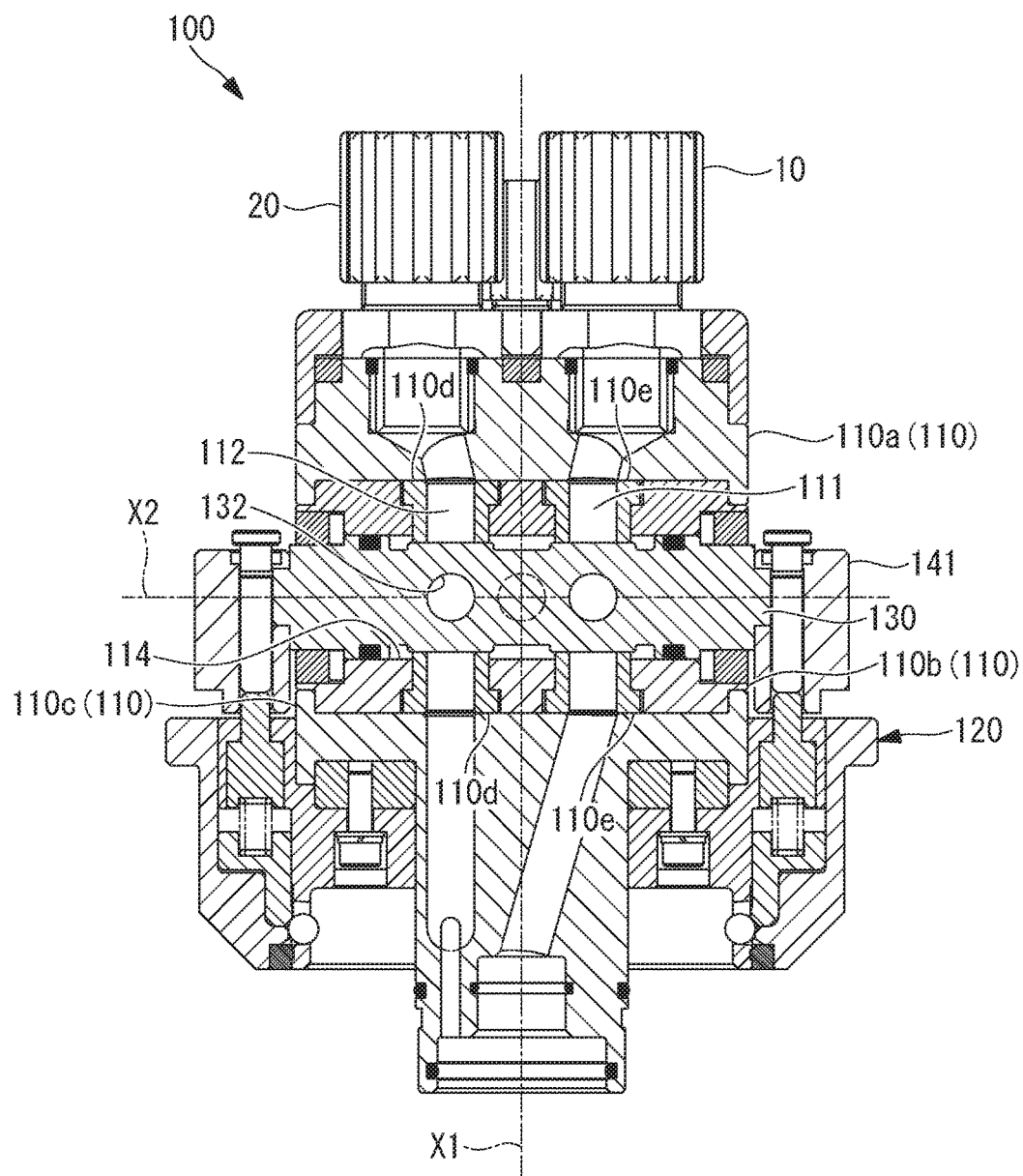
FIG. 7 is a partial sectional view taken along a line II-II of the socket shown in FIG. 5.

As shown in FIGS. 6 and 7, the socket body 110 includes a first socket body 110a, a second socket body 110b, a third socket body 110c. The second socket body 110b is disposed in a state where the second socket body 110b is sandwiched between the first socket body 110a and the third socket body 110c.

The second socket body 110b is provided with through-holes communicating with the insertion hole 114 at two upper sections and two lower sections. The second socket body 110b includes a pair of first passage members 110d and a pair of second passage members 110e which are respectively inserted into the through-holes formed at four sections.

As shown in FIG. 6, the pair of first passage members 110d is disposed at both ends of the inflow through-hole 132 in the open state of the rotary valve 130, and the pair of second passage members 110e is disposed at both ends of the outflow through-hole 131 in the open state of the rotary valve 130.

In the open state of the rotary valve 130, the pair of first passage members 110d comes into contact with peripheral portions at the both ends of the inflow through-hole 132 to prevent the second liquid inflow passage 112 and the cleaning space WS (see FIG. 8) from communicating with each other. In the open state of the rotary valve 130, the pair of second passage members 110e comes into contact with peripheral portions at the both ends of the outflow through-hole 131 to prevent the second liquid outflow passage 111 and the cleaning space WS from communicating with each other.

The pair of first passage members 110d and the pair of second passage members 110e are each made of, for example, fluororubber.

As shown in FIG. 6, in the socket 100 in which the rotary valve 130 is in the open state, the second liquid inflow passage 112 and the inflow through-hole 132 communicate with each other. Further, the second liquid outflow passage 111 and the outflow through-hole 131 communicate with each other.

On the other hand, as shown in FIG. 7, in the socket 100 in which the rotary valve 130 is in the closed state, the second liquid inflow passage 112 and the inflow through-hole 132 do not communicate with each other. Further, the second liquid outflow passage 111 and the outflow through-hole 131 do not communicate with each other.

Figure 8:
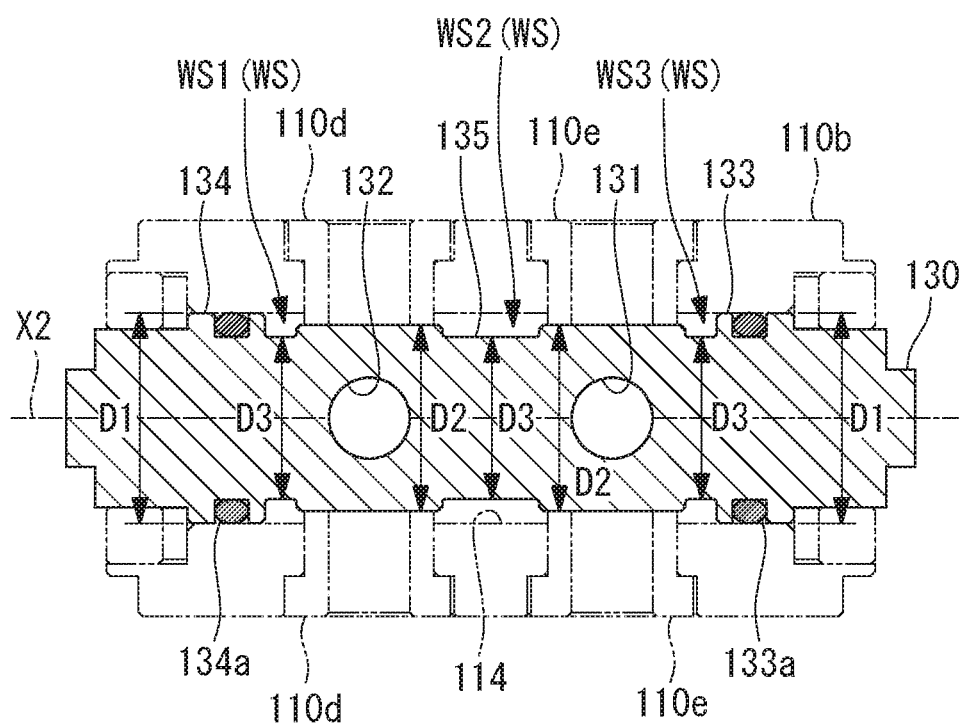
FIG. 8 is a longitudinal sectional view of a rotary valve shown in FIG. 7.

As shown in FIG. 8, the rotary valve 130 inserted into the insertion hole 114 of the second socket body 110b includes a convex portion 133 and a convex portion 134 (pair of convex portions) which are respectively in contact with the both ends of the insertion hole 114, and a concave portion 135 which is provided between the convex portion 133 and the convex portion 134. The cleaning space WS in which the cleaning fluid is circulated is formed between the concave portion 135 and the inner peripheral surface of the insertion hole 114.

As shown in FIG. 8, the cleaning space WS is a single space in which cleaning spaces WS1, WS2, and WS3 which are formed at different positions on the axial line X2 communicate with each other.

Each of the convex portion 133 and the convex portion 134 is a portion that is formed into a cylindrical shape having the outer diameter D1. The outer peripheral surface of each of the convex portion 133 and the convex portion 134 is provided with an endless annular groove extending about the axial line X2. An O-ring 133a is disposed at an annular groove formed in the convex portion 133. The O-ring 133a is in contact with the inner peripheral surface of the insertion hole 114. Similarly, an O-ring 134a is disposed at an annular groove formed in the convex portion 134. The O-ring 134a is in contact with the inner peripheral surface of the insertion hole 114.

The O-ring 133a and the O-ring 134a allow the cleaning fluid remaining in the cleaning space WS and the liquid circulated by the liquid supply system to be sealed so as to prevent the liquid from flowing to the outside. The O-ring 133a and the O-ring 134a are each made of, for example, fluororubber.

In the concave portion 135, a portion where the inflow through-hole 132 and the outflow through-hole 131 are formed is formed into a cylindrical shape with an outer diameter D2 and the other portions are formed into a cylindrical shape with an outer diameter D3. The outer diameter D2 is smaller than the outer diameter D1, and the outer diameter D3 is smaller than the outer diameter D2.

The portion of the concave portion 135 that has the outer diameter D2 is constantly in contact with the pair of first passage members 110d and the pair of second passage members 110e, regardless of the open state or the closed state of the rotary valve 130. Accordingly, in the closed state of the rotary valve 130, the liquid in the second liquid inflow passage 112 adheres to the portion of the concave portion 135 that have the outer diameter D2. Similarly, the liquid in the second liquid outflow passage 111 adheres to the portion of the concave portion 135 that have the outer diameter D2.

In the closed state of the rotary valve 130, the portion of the concave portion 135 which has the outer diameter D2 and to which the liquid adheres is exposed to the cleaning space WS. Accordingly, the liquid adhering to the portion of the concave portion 135 having the outer diameter D2 can be cleaned by circulating the cleaning fluid in the cleaning space WS.

As shown in FIG. 9, a cleaning fluid inflow port 160 and a cleaning fluid outflow port 170 are each attached to the second socket body 110b. The second socket body 110b includes a cleaning fluid inflow passage 110f for guiding the cleaning fluid to the cleaning space WS, and a cleaning fluid outflow passage 110g through which the cleaning fluid flows out of the cleaning space WS.

The cleaning fluid inflow port 160 is a port for guiding the cleaning fluid externally supplied to the cleaning fluid inflow passage 110f which is formed in the second socket body 110b. The cleaning fluid guided to the cleaning fluid inflow passage 110f is further guided to the cleaning space WS.

The cleaning fluid outflow port 170 is a port for guiding the cleaning fluid which has cleaned the cleaning space WS to the cleaning fluid outflow passage 110g formed in the second socket body 110b. The cleaning fluid guided to the cleaning fluid outflow passage 110g flows to the outside.

Next, a structure for detaching the second socket body 110b in which the rotary valve 130 is inserted into the insertion hole 114 will be described with reference to FIGS. 10 and 11.

Figure 10:
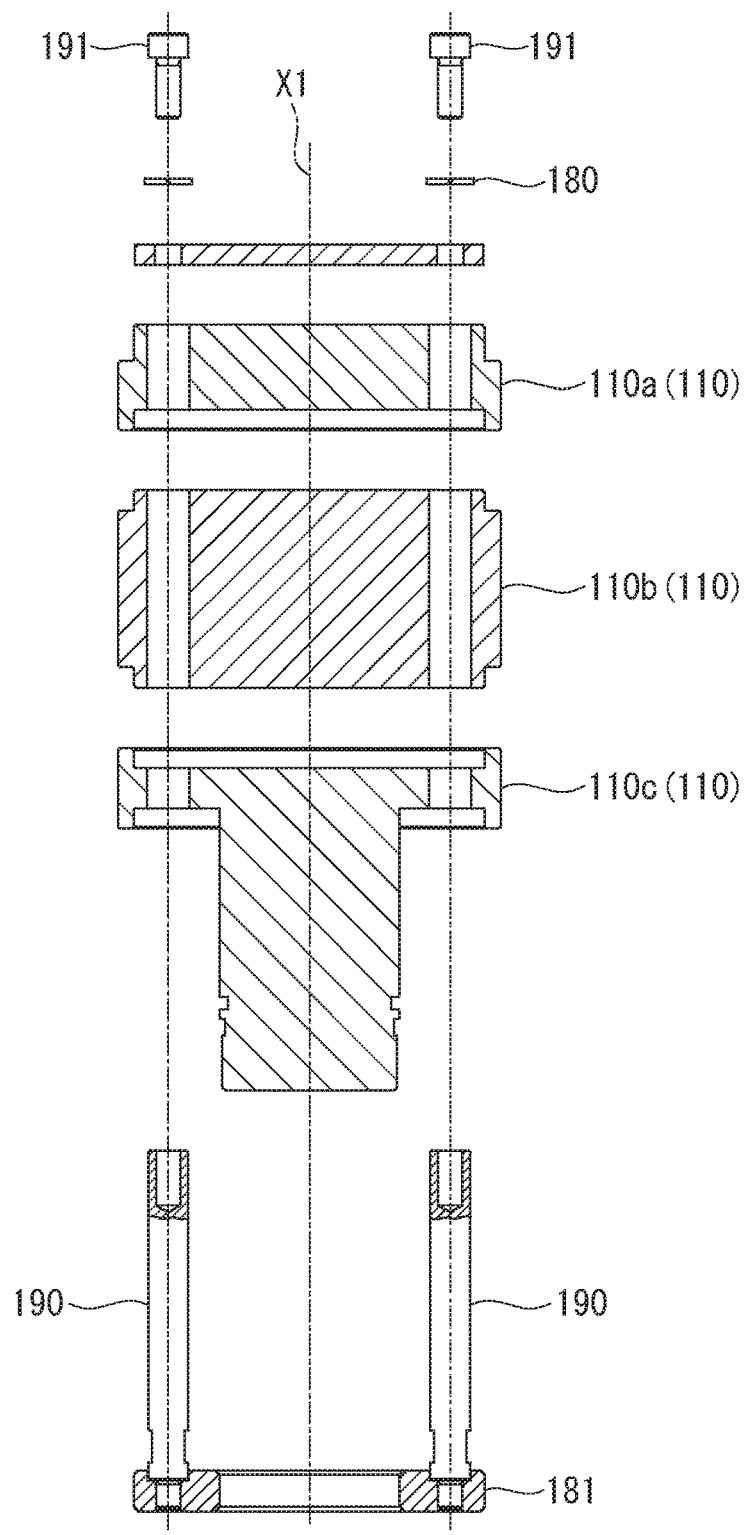
FIG. 10 is an exploded view of the socket shown in FIG. 6.
Figure 11:
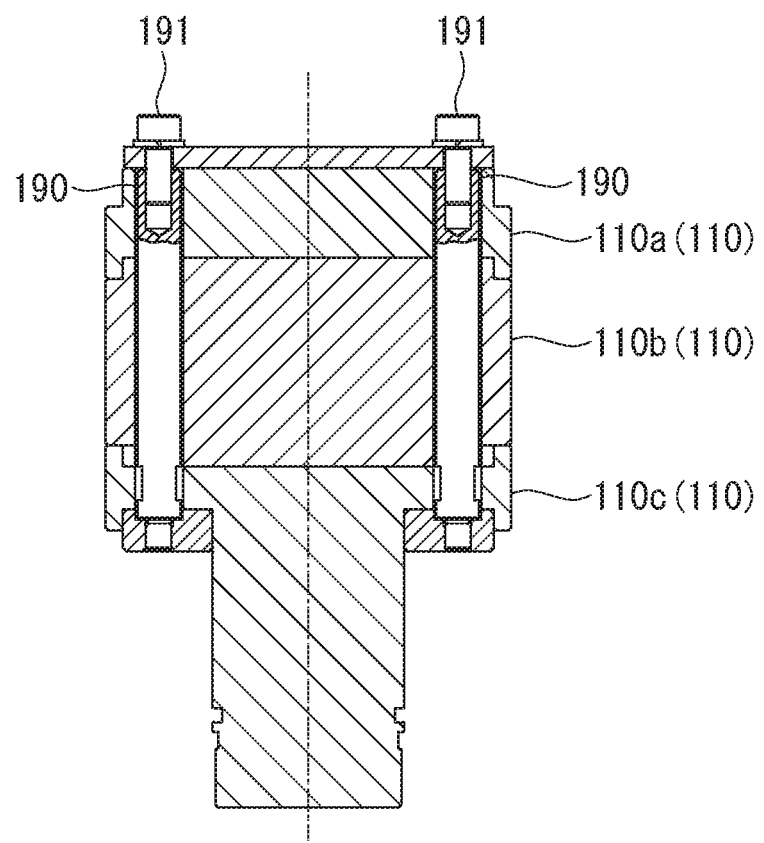
FIG. 11 is a longitudinal sectional view showing a state where the socket shown in FIG. 10 is assembled.

As shown in the exploded view of FIG. 10 and the assembly view of FIG. 11, the socket body 110 includes a first socket body 110a, a second socket body 110b, and a third socket body 110c. The third socket body 110c is disposed in a state where the second socket body 110b is sandwiched between the first socket body 110a and the third socket body 110c.

Each of the first socket body 110a, the second socket body 110b, and the third socket body 110c is provided with a plurality of through-holes through which the fastening rod 190 is inserted. The plurality of through-holes are formed so as to extend along an axial line parallel to the axial line X1. FIGS. 10 and 11 each illustrate a section where two through-holes are formed in each of the first socket body 110a, the second socket body 110b, and the third socket body 110c. The first socket body 110a, the second socket body 110b, and the third socket body 110c are each provided with through-holes at a plurality of sections, for example, at four or six sections.

The fastening rod (fastening member) 190 is a shaft-like member made of metal. A male screw formed at a lower end of the fastening rod 190 is fastened to a female screw of a fastening hole formed in a metallic plate-like member 181. A male screw formed at the outer peripheral surface of the fastening bolt 191 is fastened to a female screw of a fastening hole formed at an upper end of the fastening rod 190.

As shown in FIGS. 10 and 11, the fastening bolt (fastening member) 191 is fastened to the fastening rod 190 in a state where the first socket body 110a, the second socket body 110b, the third socket body 110c, and the metallic plate-like member 180 are inserted into the fastening rod 190.

As shown in FIGS. 10 and 11, the first socket body 110a, the second socket body 110b, and the third socket body 110c, which are made of resin, are disposed in a state where the first, second, and third socket bodies are sandwiched between the pair of the plate-like member 180 and the plate-like member 181 which are made of metal. In this state, the fastening bolt 191 is fastened to the fastening rod 190, thereby allowing the first socket body 110a, the second socket body 110b, and the third socket body 110c to be integrated together.

The state where the first socket body 110a, the second socket body 110b, and the third socket body 110c are integrally formed can be released by releasing the fastened state of the fastening bolt 191 and the fastening rod 190. In other words, the first socket body 110a, the second socket body 110b, and the third socket body 110c are detachably arranged by the fastening bolt 191 and the fastening rod 190. Accordingly, the second socket body 110b into which the rotary valve 130 is inserted can be detached from the socket 100 by releasing the fastened state of the fastening bolt 191 and the fastening rod 190. The second socket body 110b is detached from the socket 100, thereby facilitating a replacement operation for replacing the second socket body 110b or the rotary valve 130 with a new one, and also facilitating a cleaning operation for cleaning the second socket body and the rotary valve.

Next, a socket cleaning system 900 for cleaning the socket 100 will be described.

Figure 12:
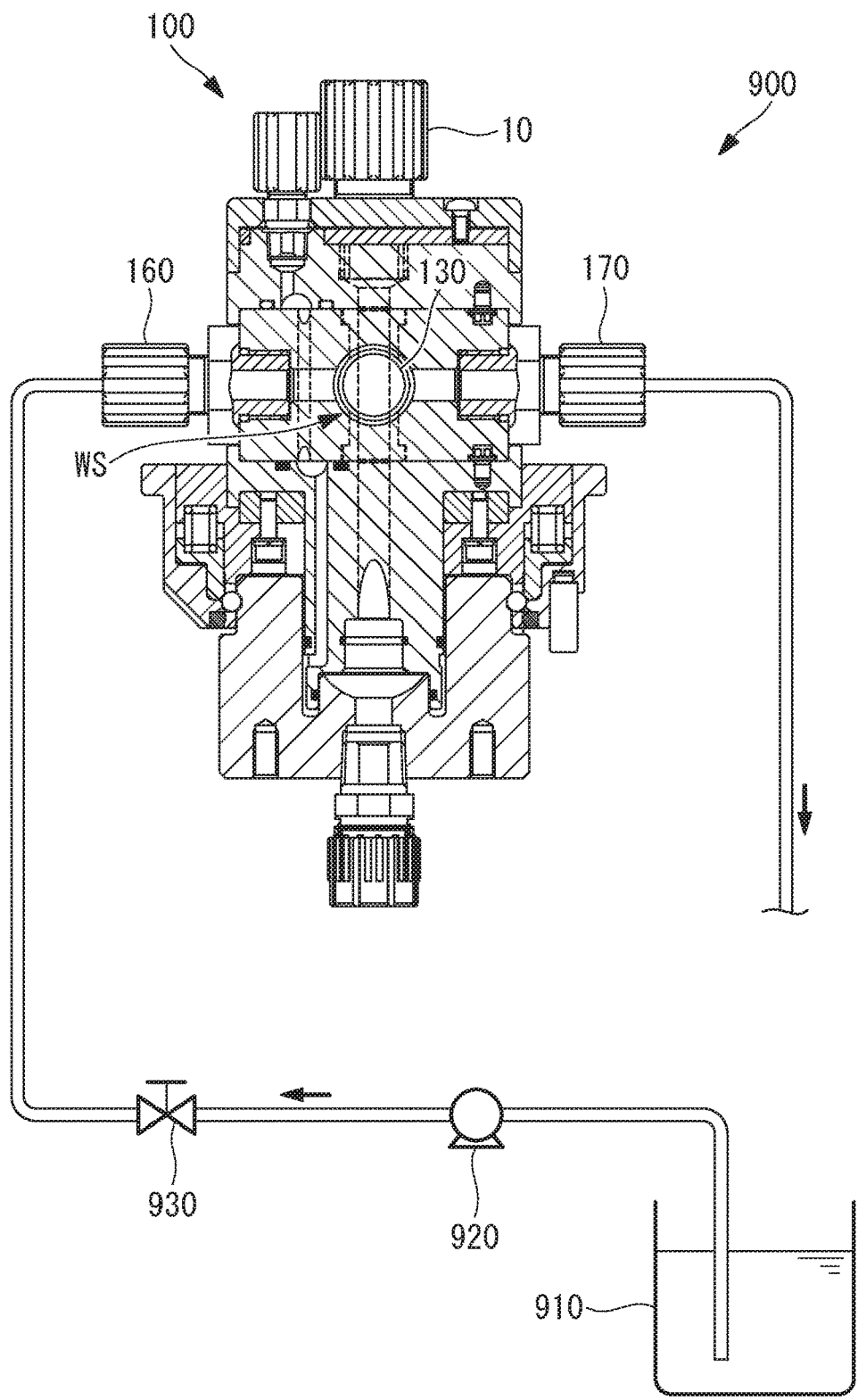
FIG. 12 is a block diagram showing an embodiment of a socket cleaning system.

The socket cleaning system 900 shown in FIG. 12 is a system for cleaning the cleaning space WS in the open state of the rotary valve 130.

The socket cleaning system 900 shown in FIG. 12 includes a cleaning fluid tank 910 for storing the cleaning fluid (for example, pure water), and a pump 920 and an opening/closing valve 930 for feeding the cleaning fluid stored in the cleaning fluid tank 910 to the cleaning fluid inflow port 160.

In the open state of the rotary valve 130, the socket cleaning system 900 brings the opening/closing valve 930 into the open state to operate the pump 920, thereby allowing the cleaning fluid stored in the cleaning fluid tank 910 to flow into the cleaning fluid inflow port 160. The cleaning fluid flowing into the cleaning fluid inflow port 160 flows out of the cleaning fluid outflow port 170 after cleaning the cleaning space WS, and is then discharged to a waste tank (not shown).

Thus, in the open state of the rotary valve 130, the socket cleaning system 900 causes the cleaning fluid to be circulated in the cleaning space WS, thereby making it possible to clean the cleaning space WS.

Note that the socket cleaning system 900 shown in FIG. 12 cleans the cleaning space WS in the open state of the rotary valve 130. However, the cleaning space WS may be cleaned in the closed state of the rotary valve 130. In this case, the cleaning fluid flows in the outflow through-hole 131 and the inflow through-hole 132 of the rotary valve 130. Accordingly, it is desirable to remove the cleaning fluid remaining in the outflow through-hole 131 and the inflow through-hole 132 after cleaning. For example, the cleaning fluid remaining in the outflow through-hole 131 and the inflow through-hole 132 can be removed by causing an inert gas, such as nitrogen gas, to flow in from the cleaning fluid inflow port 160 after cleaning by the cleaning fluid and to be discharged from the cleaning fluid outflow port 170.

Next, another socket cleaning system 901 for cleaning the socket 100 will be described.

Figure 13:
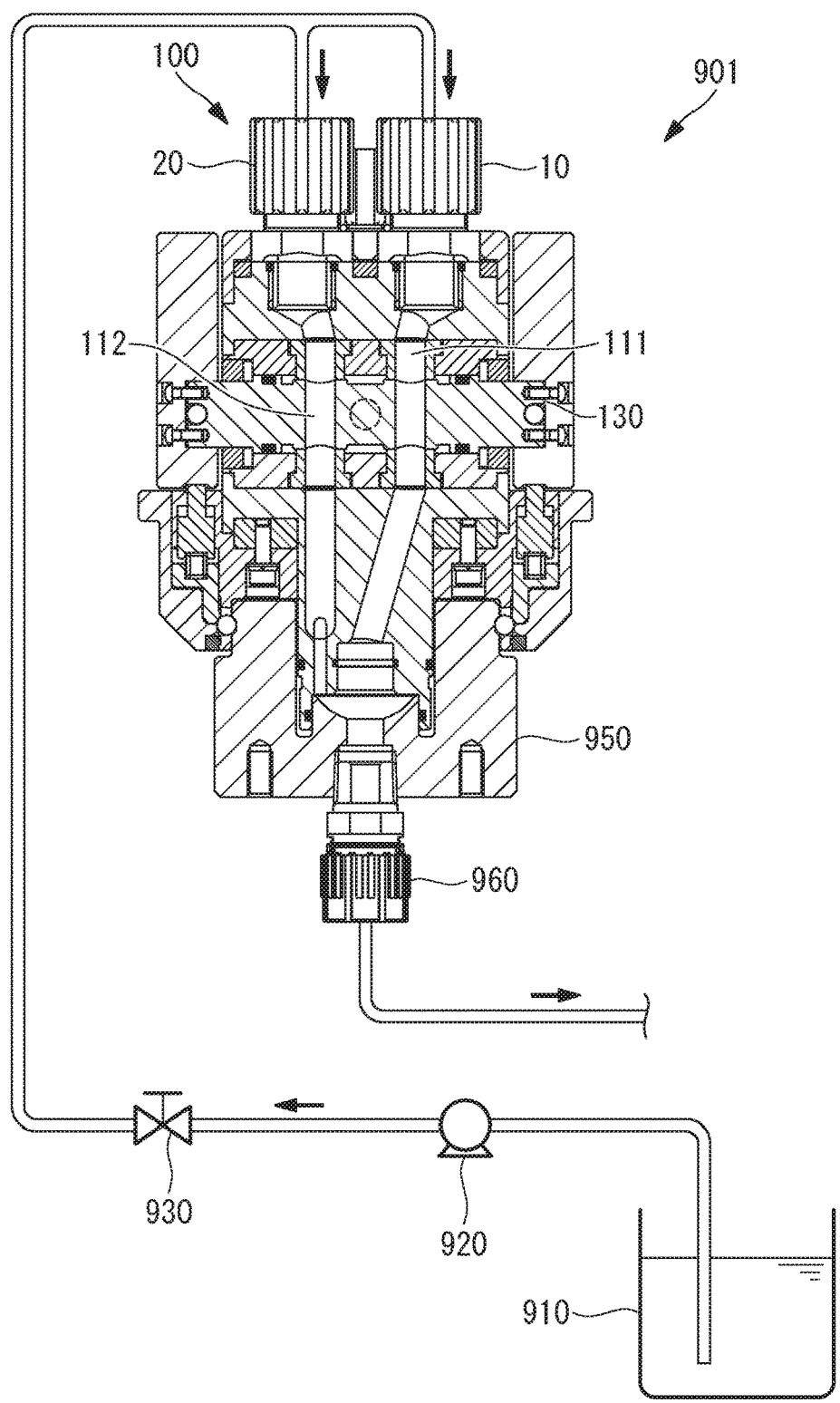
FIG. 13 is a block diagram showing an embodiment of the socket cleaning system.

The socket cleaning system 901 shown in FIG. 13 is a system for cleaning the second liquid inflow passage 112 and the second liquid outflow passage 111 in the open state of the rotary valve 130.

The socket cleaning system 901 shown in FIG. 13 includes the cleaning fluid tank 910 for storing the cleaning fluid (for example, pure water); the pump 920 and the opening/closing valve 930 for feeding the cleaning fluid stored in the cleaning fluid tank 910 to the cleaning fluid inflow port 160; and a socket attachment device 950 to which the socket 100 is attached in a state where a lower end thereof is inserted.

In the open state of the rotary valve 130, the socket cleaning system 901 brings the opening/closing valve 930 into the open state to operate the pump 920, thereby allowing the cleaning fluid stored in the cleaning fluid tank 910 to flow into both the outflow port 10 and the inflow port 20. The cleaning fluid flowing into the outflow port 10 flows out of an outflow port 960 of the socket attachment device 950 after cleaning the second liquid outflow passage 111, and is then discharged to the waste tank (not shown).

Similarly, the cleaning fluid flowing into the inflow port 20 flows out of the outflow port 960 of the socket attachment device 950 after cleaning the second liquid inflow passage 112, and is then discharged to the waste tank (not shown).

Thus, in the open state of the rotary valve 130, the socket cleaning system 901 causes the cleaning fluid to be circulated in the second liquid inflow passage 112 and the second liquid outflow passage 111, thereby making it possible to clean the second liquid inflow passage and the second liquid outflow passage.

Next, a still another socket cleaning system 902 for cleaning the socket 100 will be described.

Figure 14:
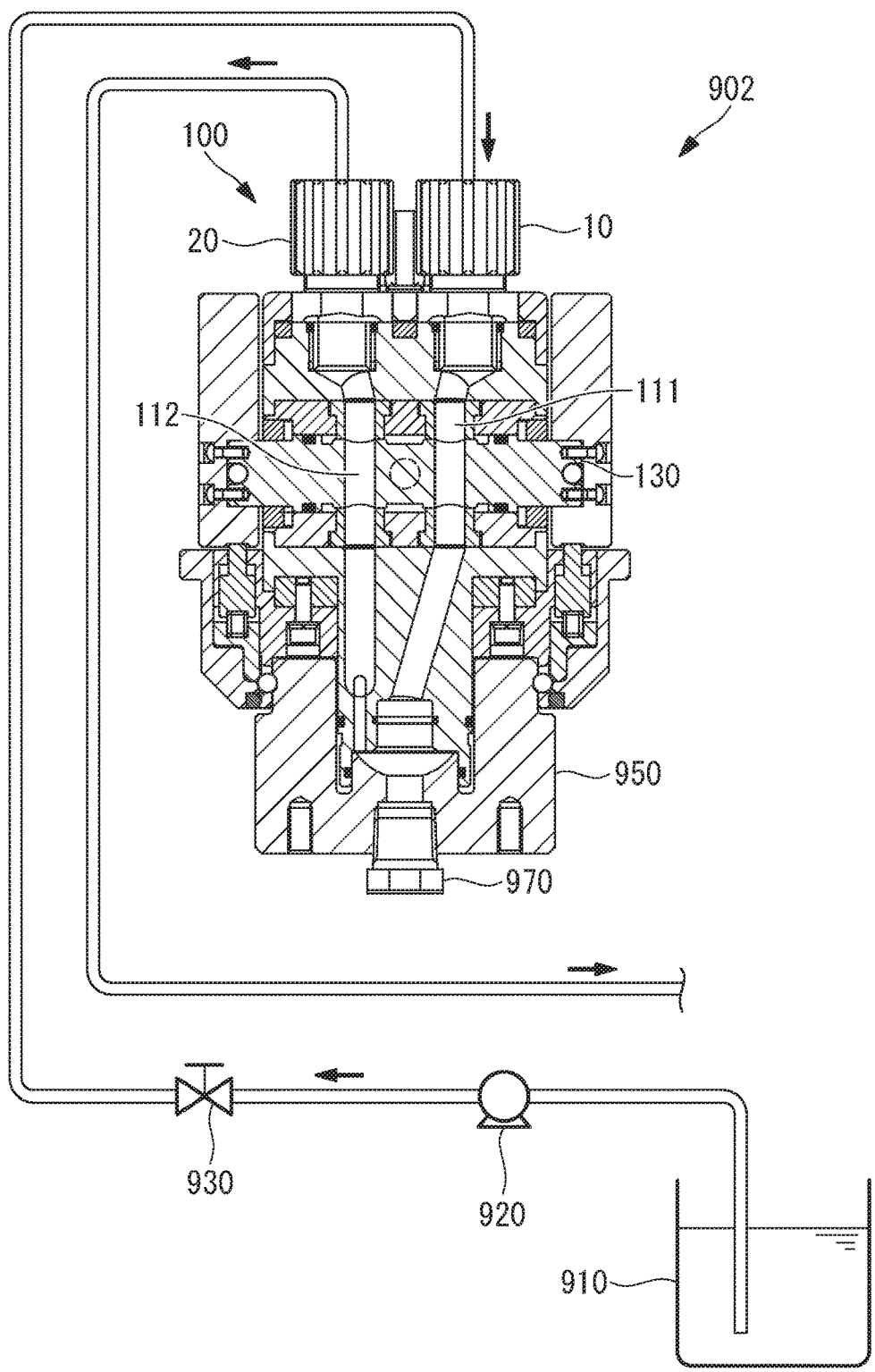
FIG. 14 is a block diagram showing an embodiment of the socket cleaning system.

The socket cleaning system 902 shown in FIG. 14 is a system for cleaning the second liquid inflow passage 112 and the second liquid outflow passage 111 in the open state of the rotary valve 130.

The socket cleaning system 902 shown in FIG. 14 includes the cleaning fluid tank 910 for storing the cleaning fluid (for example, pure water), the pump 920 and the opening/closing valve 930 for feeding the cleaning fluid stored in the cleaning fluid tank 910 to the cleaning fluid inflow port 160, and the socket attachment device 950 to which the socket 100 is attached in a state where a lower end thereof is inserted.

In the open state of the rotary valve 130, the socket cleaning system 902 brings the opening/closing valve 930 into the open state to operate the pump 920, thereby allowing the cleaning fluid stored in the cleaning fluid tank 910 to flow into the outflow port 10. The cleaning fluid flowing into the outflow port 10 cleans the second liquid inflow passage 112 after cleaning the second liquid outflow passage 111, and flows out of the inflow port 20 and is then discharged to the waste tank (not shown).

The cleaning fluid which has cleaned the second liquid outflow passage 111 is guided to the second liquid inflow passage 112. This is because a sealing member 970 for preventing the outflow of the liquid is attached to a lower end of the socket attachment device 950.

Thus, in the open state of the rotary valve 130, the socket cleaning system 902 causes the cleaning fluid to be circulated in the second liquid inflow passage 112 and the second liquid outflow passage 111, thereby making it possible to clean the second liquid inflow passage and the second liquid outflow passage.

The operation and effects provided by the connector 400 according to this embodiment will be described.

In the connector 400 according to this embodiment, for example, in the state where the socket 100 is attached to the plug 200, the liquid is sucked by the external pump, so that the liquid drawn out of the first liquid outflow passage 211 of the plug 200 flows to the outside via the second liquid outflow passage 111 of the socket 100. Further, the liquid circulated by the external pump is guided into the liquid storing container 500 from the first liquid inflow passage 212 of the plug 200 via the second liquid inflow passage 112 of the socket 100. Thus, the connector 400 according to this embodiment has a structure that allows the liquid contained in the liquid storing container 500 to flow to the outside and allows the liquid which has flown to the outside and circulated to flow into the liquid storing container 500.

The structure in which the liquid circulation state is switched by bringing the valve body provided on the socket and the valve seat provided on the plug into contact with each other or separating the valve body and the valve seat from each other includes an urging mechanism which has a section where the passage sectional area is locally reduced and urges the valve body into the closed state. Accordingly, when the liquid is a slurry containing a polishing material or the like (a slurry in which solid particles are dispersed), the solid particles adhere to the section where the passage sectional area is locally reduced, which deteriorates the circulation of the liquid. Further, if the solid particles adhere to the urging mechanism of the valve body and are solidified, the valve body cannot be smoothly opened or closed.

On the other hand, in the connector 400 according to this embodiment, the rotary valve 130 is switched to the open state or the closed state by the switching mechanism 140, thereby making it possible to switch the open state in which the liquid is circulated in the second liquid outflow passage 111 and the second liquid inflow passage 112 via the outflow through-hole 131 and the inflow through-hole 132 and the closed state in which the liquid is not circulated in the second liquid outflow passage 111 and the second liquid inflow passage 112 via the outflow through-hole 131 and the inflow through-hole 132.

Therefore, it is possible to prevent such deficiencies that the solid particles are accumulated on the section where the passage sectional area is locally reduced, which deteriorates the circulation of the liquid, and the solid particles adhere to the urging mechanism of the valve body, which makes it difficult to smoothly open and close the valve.

Further, the rotary valve 130 is switched to the closed state by the switching mechanism 140, thereby preventing the liquid remaining in the socket 100 from flowing to the outside when the socket 100 is detached from the plug 200.

Furthermore, in the connector 400 according to this embodiment, the cleaning space WS is formed between the concave portion 135, which is provided between the pair of convex portions 133 and 134 of the rotary valve 130, and the insertion hole 114 of the socket body 110. In the closed state, the cleaning fluid flowing into the cleaning space WS from the cleaning fluid inflow passage 110$f$ appropriately cleans the solid particles adhering to the outer peripheral surface of the rotary valve 130, and then flows out of the cleaning fluid outflow passage 110$g$.

Thus, the connector 400 according to this embodiment can prevent a deficiency that the solid particles are accumulated on the outer peripheral surface of the rotary valve 130, which makes it difficult to smoothly open and close the rotary valve.

In the connector according to this embodiment, the socket body 110 includes the pair of first passage members 110$d$ disposed at both ends of the inflow through-hole 132 in the open state, and the pair of second passage members 110$e$ disposed at both ends of the outflow through-hole 131 in the open state. In the open state, the pair of first passage members 110$d$ comes into contact with peripheral portions at the both ends of the inflow through-hole 132 to prevent the second liquid inflow passage 112 and the cleaning space WS from communicating with each other. In the open state, the pair of second passage members 110$e$ comes into contact with peripheral portions at the both ends of the outflow through-hole 131 to prevent the second liquid outflow passage 111 and the cleaning space WS from communicating with each other.

This structure prevents the liquid circulated in the inflow through-hole 132 and the liquid circulated in the outflow through-hole 131 from being guided to the cleaning space WS in the open state of the rotary valve 130. Accordingly, even when the liquid is a slurry containing a polishing material or the like, such a deficiency that the liquid flows into the cleaning space and adheres thereto can be prevented.

In the connector 400 according to this embodiment, the socket body 110 includes: the first socket body 110$a$; the second socket body 110$b$ provided with the insertion hole 114; and the third socket body 110$c$ disposed in a state where the second socket body 110$b$ is sandwiched between the first socket body 110$a$ and the third socket body 110$c$. The first socket body 110$a$, the second socket body 110$b$, and the third socket body 110$c$ are detachably arranged by the fastening rod 190 and the fastening bolt 191.

This structure facilitates a replacement operation for replacing the second socket body 110$b$ or the rotary valve 130 with a new one, and also facilitates a cleaning operation for cleaning the second socket body and the rotary valve.

Other Embodiments

In the above description, the key ring 300 is fixed to the opening 510 of the liquid storing container 500 and the ball lock mechanism 120 of the socket 100 is engaged with the engagement groove 310 of the key ring 300. In other words, a structure in which the key ring 300 is fixed to the opening 510 of the liquid storing container 500 is used as an opening of the liquid storing container 500 and the socket 100 is fixed to the opening. However, the present disclosure may have another aspect.

For example, the ball lock mechanism 120 of the socket 100 may be directly engaged with the engagement groove 511 of the opening 510, instead of fixing the key ring 300 to the opening 510 of the liquid storing container 500.

The invention claimed is:

1. A connector to be attached to an opening of a liquid storing container, the connector comprising:
   a plug to be attached to the opening; and
   a socket to be detachably attached to the plug, wherein
   the plug includes a plug body in which a first liquid outflow passage through which a liquid contained in the liquid storing container is drawn out and a first liquid inflow passage for guiding the liquid flowing in from an outside of the liquid storing container into the liquid storing container are formed, and
   the socket includes:
      a socket body in which a second liquid outflow passage through which the liquid is drawn out from the first liquid outflow passage flows to the outside and a second liquid inflow passage for guiding the liquid flowing in from the outside of the liquid storing container into the second liquid inflow passage are formed, the socket body being provided with a cylindrical insertion hole penetrating through each of the second liquid outflow passage and the second liquid inflow passage;
      a columnar rotary valve including an outflow through-hole formed at a position where the second liquid outflow passage is disposed and an inflow through-hole formed at a position where the second liquid inflow passage is disposed, the rotary valve being inserted into the insertion hole; and
      a switching mechanism that causes the rotary valve to be rotated and switches an open state and a closed state, the open state being a state in which the outflow through-hole and the second liquid outflow passage communicate with each other and the inflow through-hole and the second liquid inflow passage communicate with each other, the closed state being a state in which the outflow through-hole and the second liquid outflow passage do not communicate with each other and the inflow through-hole and the second liquid inflow passage do not communicate with each other,
   the rotary valve includes:
      a pair of convex portions respectively in contact with both ends of the insertion hole to seal an outflow of the liquid; and
      a concave portion provided between the pair of convex portions, a cleaning space in which a cleaning fluid is circulated being formed between the concave portion and an inner peripheral surface of the insertion hole, and
   the socket body includes:
      a cleaning fluid inflow passage for guiding the cleaning fluid to the cleaning space; and
      a cleaning fluid outflow passage through which the cleaning fluid flows out of the cleaning space.

2. The connector according to claim 1, wherein
   the socket body includes: a pair of first passage members respectively disposed at both ends of the inflow through-hole in the open state; and a pair of second passage members respectively disposed at both ends of the outflow through-hole in the open state,
   the pair of first passage members comes into contact with peripheral portions at the both ends of the inflow through-hole in the open state to prevent the second liquid inflow passage and the cleaning space from communicating with each other, and
   the pair of second passage members comes into contact with peripheral portions at the both ends of the outflow through-hole in the open state to prevent the second liquid outflow passage and the cleaning space from communicating with each other.

3. The connector according to claim 1, wherein
   the socket body includes:
      a first socket body;
      a second socket body having the insertion hole formed therein; and
      a third socket body disposed in a state where the second socket body is sandwiched between the first socket body and the third socket body, and
   the first socket body, the second socket body, and the third socket body are detachably arranged by a fastening member.

4. A socket to be detachably attached to a plug to be attached to an opening of a liquid storing container, the plug including a plug body in which a first liquid outflow passage through which a liquid contained in the liquid storing container is drawn out and a first liquid inflow passage for guiding the liquid flowing in from an outside of the liquid storing container into the liquid storing container are formed, the socket comprising:
   a socket body in which a second liquid outflow passage through which the liquid is drawn out from the first liquid outflow passage flows to the outside and a second liquid inflow passage for guiding the liquid flowing in from the outside of the liquid storing container into the first liquid inflow passage are formed, the socket body being provided with a cylindrical insertion hole penetrating through each of the second liquid outflow passage and the second liquid inflow passage;
   a columnar rotary valve including an outflow through-hole formed at a position where the second liquid outflow passage is disposed and an inflow through-hole formed at a position where the second liquid inflow passage is disposed, the rotary valve being inserted into the insertion hole; and
   a switching mechanism that causes the rotary valve to be rotated and switches an open state and a closed state, the open state being a state in which the outflow through-hole and the second liquid outflow passage communicate with each other and the inflow through-hole and the second liquid inflow passage communicate with each other, the closed state being a state in which the outflow through-hole and the second liquid outflow passage do not communicate with each other and the inflow through-hole and the second liquid inflow passage do not communicate with each other, wherein
   the rotary valve includes: a pair of convex portions respectively in contact with both ends of the insertion hole to seal an outflow of the liquid; and a concave portion provided between the pair of convex portions, a cleaning space in which a cleaning fluid is circulated being formed between the concave portion and an inner peripheral surface of the insertion hole, and
   the socket body includes:
      a cleaning fluid inflow passage for guiding the cleaning fluid to the cleaning space; and a cleaning fluid outflow passage through which the cleaning fluid flows out of the cleaning space.

\* \* \* \* \*